United States Patent [19]

Mills

[11] Patent Number: 4,823,627
[45] Date of Patent: Apr. 25, 1989

[54] MECHANICAL TRANSMISSION

[76] Inventor: Ned D. Mills, P.O. Box 924, Richland, Wash. 99352

[21] Appl. No.: 66,238

[22] Filed: Jun. 23, 1987

[51] Int. Cl.[4] ............................................. F16H 29/00
[52] U.S. Cl. ........................................ 74/117; 74/124; 74/125; 74/125.5
[58] Field of Search ................ 74/117, 122, 123, 124, 74/125, 125.5

[56] References Cited

U.S. PATENT DOCUMENTS

| | | | |
|---|---|---|---|
| 1,280,901 | 10/1918 | Tornberg | 74/123 |
| 1,553,193 | 9/1925 | Siddle | 74/124 |
| 1,780,423 | 11/1930 | Hallett | 74/117 |
| 1,937,127 | 11/1933 | Pitter | 74/53 |
| 1,991,820 | 2/1935 | Rafting | 74/113 |
| 2,234,836 | 9/1941 | Vick | 74/70 |
| 2,241,651 | 4/1941 | Thoma | 103/162 |
| 2,491,624 | 12/1949 | Shaff | 74/60 |
| 2,493,417 | 1/1950 | Orshansky | 74/116 |
| 2,554,463 | 5/1951 | Klamp | 74/124 |
| 2,660,065 | 11/1953 | Williams | 74/25 |
| 2,824,454 | 2/1958 | Rider | 74/48 |
| 2,898,770 | 8/1959 | Van Hook | 74/123 |
| 2,959,062 | 11/1960 | Looker | 74/117 |
| 2,983,154 | 5/1961 | Neukirch | 74/117 |
| 3,139,006 | 6/1964 | Budzich | 91/199 |
| 3,171,289 | 3/1965 | Riedl | 74/117 |
| 3,229,549 | 1/1966 | Riedl | 74/640 |
| 3,306,117 | 2/1967 | Riedl | 74/117 |
| 3,359,813 | 12/1967 | Okano | 74/117 |
| 3,448,627 | 6/1969 | Brooks | 74/117 |
| 3,495,479 | 2/1970 | Rass | 74/751 |
| 3,561,290 | 2/1971 | Ruck | 74/679 |
| 3,595,103 | 7/1971 | Wildhaber | 74/800 |
| 4,103,556 | 8/1978 | Niday | 74/25 |
| 4,125,033 | 11/1978 | Riedl | 74/125.5 |
| 4,487,085 | 12/1984 | Collins | 74/113 |

FOREIGN PATENT DOCUMENTS

| | | | |
|---|---|---|---|
| 1003529 | 2/1957 | Fed. Rep. of Germany | 74/125 |
| 1107520 | 7/1959 | Fed. Rep. of Germany | |
| 2317061 | 10/1973 | Fed. Rep. of Germany | 74/117 |
| 556492 | 7/1923 | France | 74/124 |
| 857205 | 8/1940 | France | 74/117 |
| 917098 | 12/1946 | France | 74/117 |
| 407084 | 8/1944 | Italy | 74/117 |
| 58-91951 | 6/1983 | Japan | 74/117 |
| 8503 | of 1913 | United Kingdom | 74/123 |
| 512769 | 12/1937 | United Kingdom | 74/124 |
| 592661 | 9/1947 | United Kingdom | 74/124 |

Primary Examiner—Leslie A. Braun
Assistant Examiner—Scott Anchell
Attorney, Agent, or Firm—Wells, St. John & Roberts

[57] ABSTRACT

A mechanical transmission converts rotational motion of an input drive shaft to an alternating radially directed motion of a selected amplitude. The alternating motion imparts rotational movement to an output driven shaft through imposition of one-way clutches. The alternating radially directed motion is varied by means of a rotatable self-balancing cam assembly that maintains the transmission in balance under its full range of operating conditions.

21 Claims, 9 Drawing Sheets

MECHANICAL TRANSMISSION

TECHNICAL FIELD

This invention relates to transmissions.

BACKGROUND OF THE INVENTION

Transmissions convert rotary motion of a drive shaft to rotary motion of a driven shaft at a different speed and torque. Mechanical transmissions typically make use of gearing having two or more selectable fixed ratios to reduce or increase rotation of an input shaft. Hydraulic transmissions make use of fluid interacting with impellers to transmit rotary motion from one shaft to another over a range of drive ratios. Both have drawbacks.

Gearing typically operates using fixed input to output ratios. The ratio can usually be changed only by changing gears. Such transmissions are therefore usually large and heavy mechanisms. Weight of the transmission and friction loss through the various combinations of gears can substantially reduce the efficiency of an entire drive train.

The disadvantage of hydraulic conversion is the ever-present "slip" from the lack of positive interaction between driving and driven shafts. Hydraulic transmissions also suffer from bulk and are typically very costly.

Many attempts have been made to eliminate these disadvantages by providing a continuously variable speed change by simple mechanical means. However, a need remains for an infinitely variable speed transmission which is reliable and capable of a long operating life.

BRIEF DESCRIPTION OF THE DRAWINGS

The preferred embodiment of the invention is illustrated in the accompanying drawings, in which.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Transmissions of the type represented by the present invention function to mechanically convert rotational motion of the input drive shaft to high frequency reciprocating motion of a selected amplitude. In the context of this application, "reciprocating motion" is intended to imply any alternating back and forth motion, whether along a line, an arc, or some other path. Such high frequency reciprocating motion is translated back to rotational motion for driving an output driven shaft. Adjustment means are provided for selectively varying the selected amplitude of the reciprocating motion. Such amplitude determines output driven shaft speed.

One version of a present transmission 10 in accordance with the invention is illustrated in FIGS. 1-10. Transmission 10 functions to mechanically convert rotary motion of an input drive shaft 12 to an intermediate radially directed reciprocating motion by means of variable eccentric transmission components. This radially directed reciprocating motion is subsequently converted back to rotary motion for driving an output driven shaft 14. The variable eccentrics are adjustable to enable the output rotational speed of shaft 14 to be infinitely varied proportionally from zero up to the rotational speed of input drive shaft 12.

Figure 1:
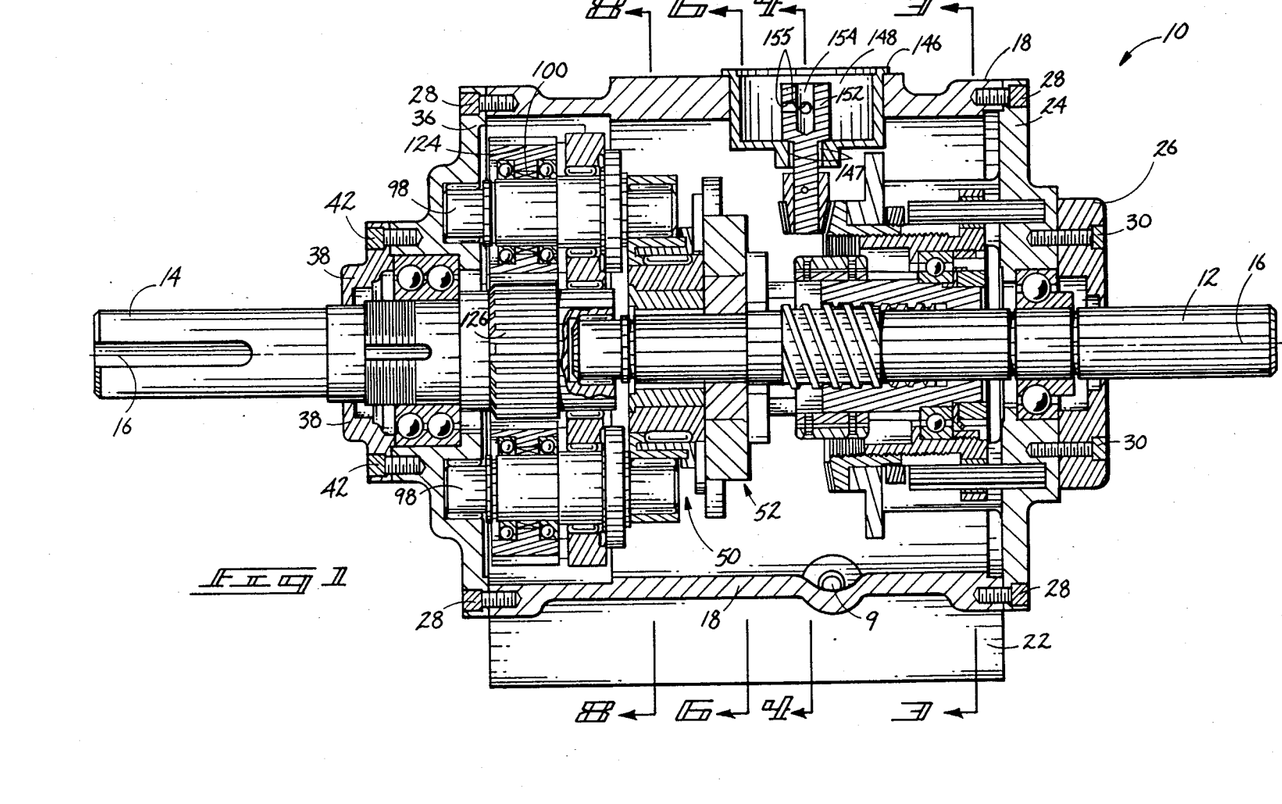
FIG. 1 is a longitudinal diagrammatic and partial sectional view of a transmission in accordance with the invention.
Figures 2, 2A:
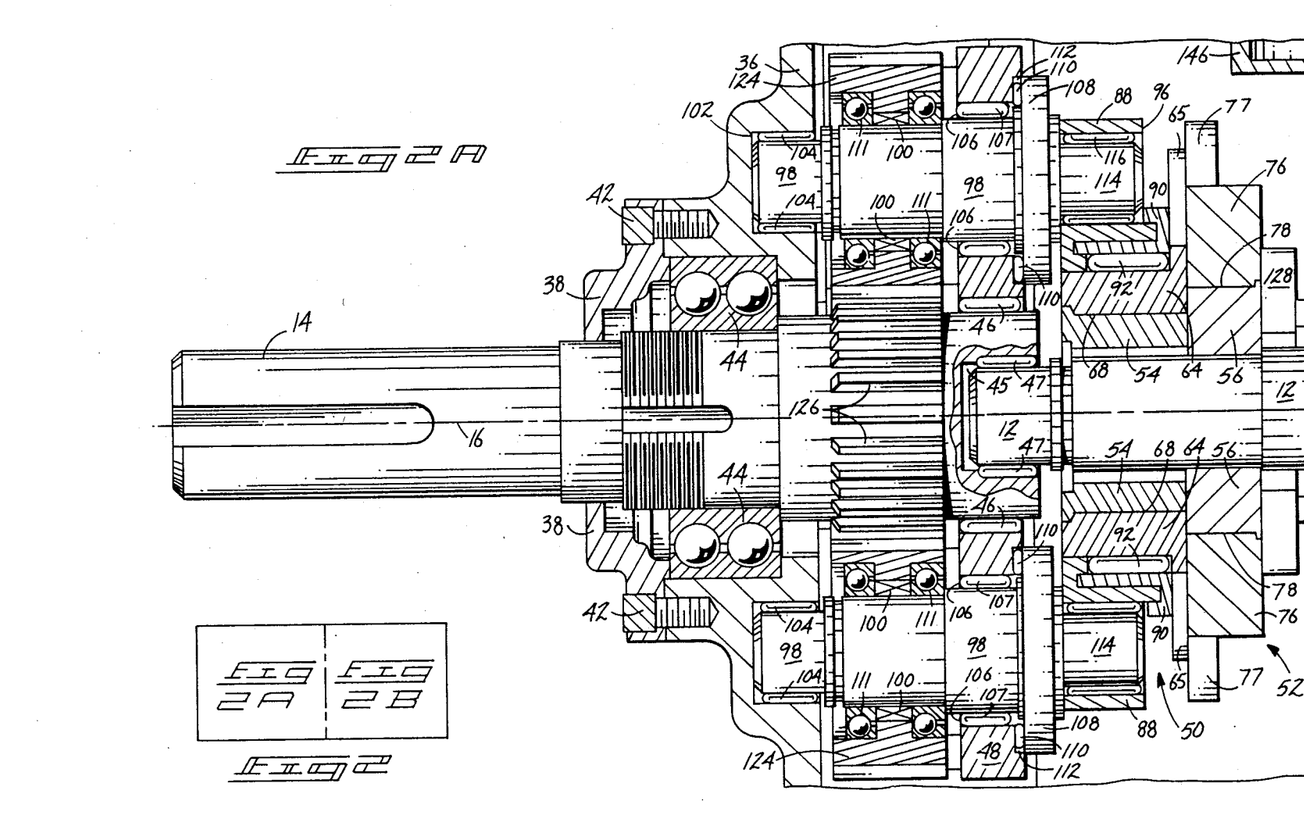
FIG. 2 is an enlargement of FIG. 1 with the transmission housing having been removed; it is divided into two parts, FIG. 2A and 2B.
Figure 2B:
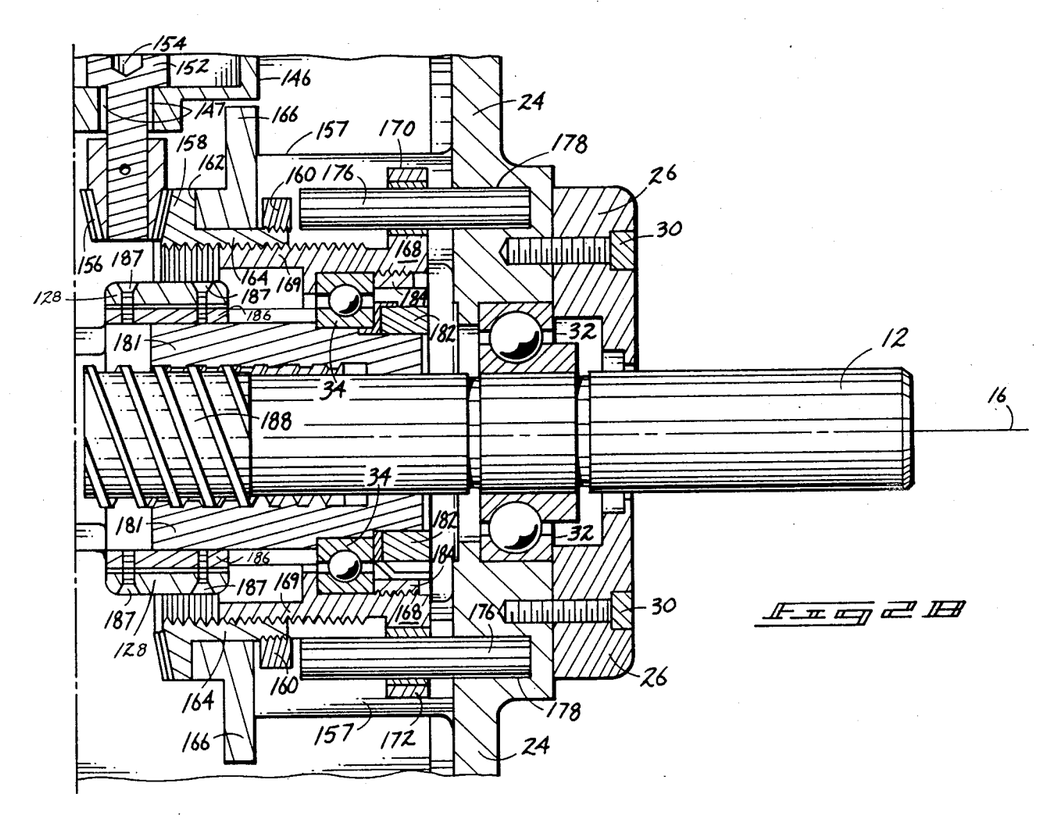
Figure 3:
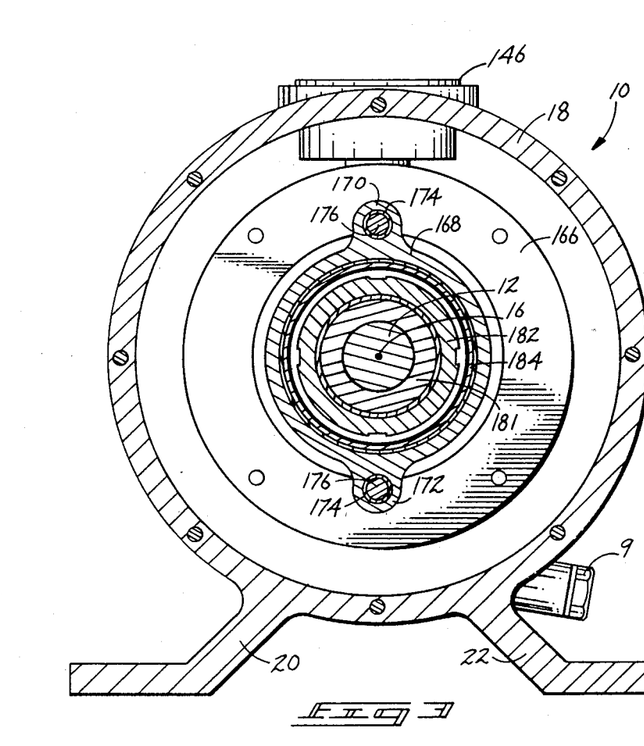
FIG. 3 is a perpendicular planar view taken through line 3—3 in FIG. 1.
Figure 9:
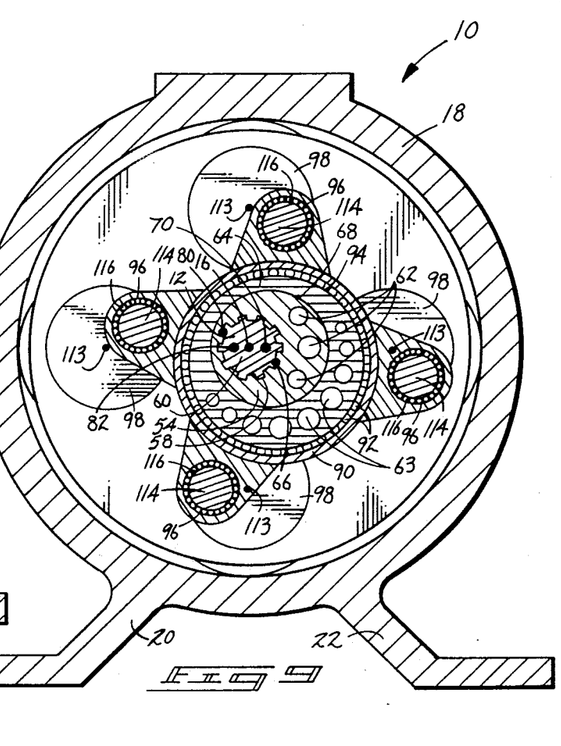
FIG. 9 is a perpendicular planar view as would be taken through line 8—8 in FIG. 1 when the transmission is configured to be in the second operating condition.
Figure 10:
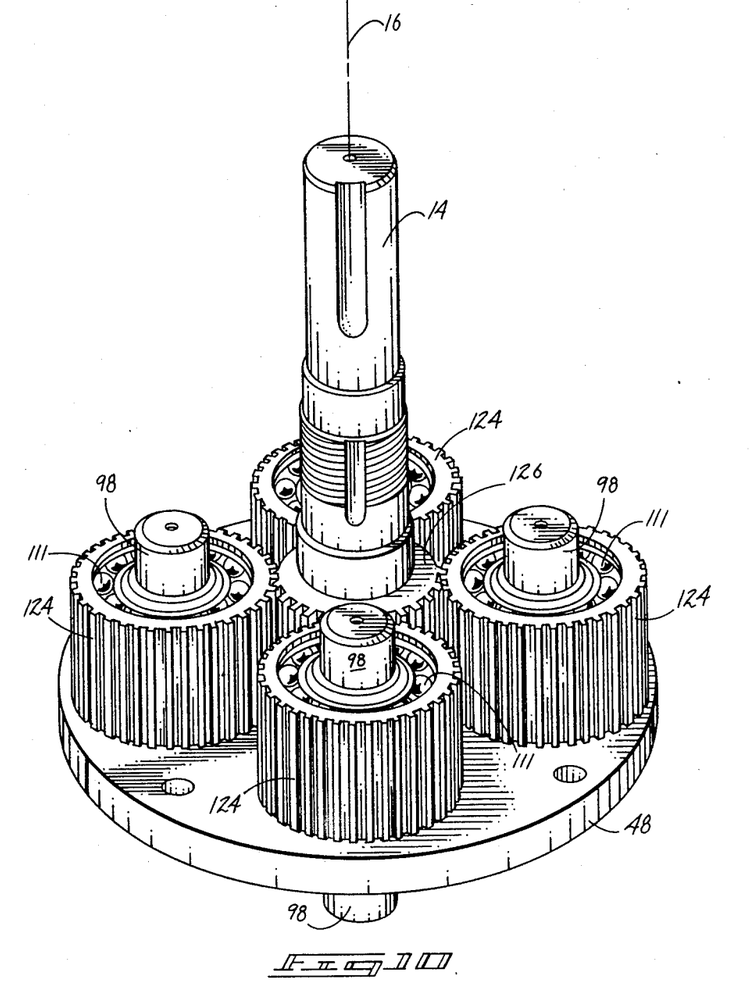
FIG. 10 is a perspective view of sun and planetary gear components of the transmission employed for driving the output driven shaft.

FIGS. 1, 2, 3, 4, 6 and 8 illustrate the configuration of the various transmission components when the transmission is set to be in an idle mode. In other words, rotational speed of output driven shaft 14 is zero regardless of the rotational speed of input drive shaft 12. FIGS. 5, 7 and 9 illustrate the configuration of the various transmission components when the transmission is configured to provide rotation of output driven shaft 14 at some predetermined rate proportional to the rotational speed of input drive shaft 12. FIGS. 3 and 10 are views of different sections of the transmission as they appear regardless of its operational configuration. In the described embodiment, input drive shaft 12 and output driven shaft 14 are mounted for coaxial rotation about a central axis 16. It is to be understood that alternate configurations could be employed in which the output and input shafts are not coaxially mounted.

Transmission 10 includes a cylindrically hollow housing 18 supported by a pair of support legs 20, 22. An oil drain plug 9 is included at a lowermost point of housing 18. For ease of description, the end of transmission 10 from which output driven shaft 14 extends is hereafter referred to as the "output end", while that from which input drive shaft 12 extends is referred to as the "input end". Housing 18 is sealed at the input end by means of an input end cap 24 and input shaft seal cap 26. Input end cap 24 is bolted directly to the input end of housing 18 by a plurality of mounting bolts 28. Input shaft seal cap 26 is bolted to the outer surface of input end cap 24 by a plurality of mounting bolts 30. Input drive shaft 12 is rotatably supported by a single row, deep groove ball bearing 32 retained relative to the housing by input end cap 24 and input shaft seal cap 26 and also by a roller bearing 47, which will be more fully described below.

The output end of housing 18 is sealed by means of an end cap 36, which also functions as a gear mounting plate, and output shaft seal cap 38. End cap/gear mounting plate 36 is directly mounted to the output end of housing 18 by a plurality of mounting bolts 40. Output shaft seal cap 38 is bolted to the outermost surface of end cap/gear mounting plate 36 by a plurality of mounting bolts 42. Output driven shaft 14 is rotatably supported by a double row, deep grooved ball bearing 44, held in position by end cap/gear mounting plate 36 and output shaft seal cap 38, and by an internally configured bearing 46 formed as part of a pinion support plate 48, as will also be more fully described below. The input end of output driven shaft 14 includes a cylindrical opening 45 which receives a needle roller bearing 47. Needle roller bearing 47 internally receives the output end of input drive shaft 12. In this manner, input drive shaft 12 and output driven shaft 14 are coaxially supported for separate rotation relative to housing 18.

Alternating radially directed motion of a selected amplitude relative to the input drive shaft 12 upon its rotation is imparted by a first eccentrically mounted means 50. A second eccentrically mounted means 52 is adapted for imparting alternating radially directed motion of a selected amplitude relative to input drive shaft 12 which is opposite in radial direction to that imparted by the first eccentrically mounted means. In this manner, eccentric rotational forces that would otherwise be imparted to the input drive shaft are offset by cooperation of the first and second eccentrically mounted means.

Both the first and second eccentrically mounted means are mounted to the input drive shaft for selective rotation relative thereto by eccentric bearing means secured to the input drive shaft. More particularly, the depicted eccentric bearing means is comprised of a first eccentric bearing means 54 and a second eccentric bearing means 56. First eccentric bearing means 54 is positioned adjacent the innermost (output) end of input drive shaft 12, with the second eccentric bearing means 56 being positioned axially adjacent thereto.

Figure 8:
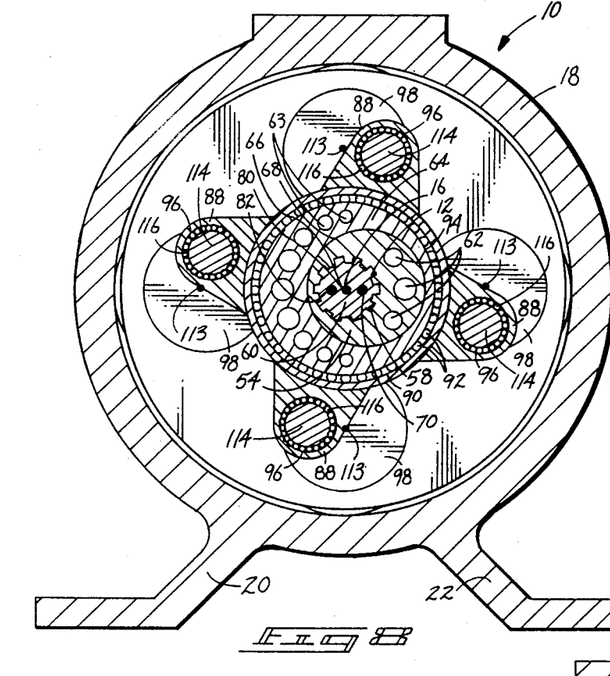
FIG. 8 is a perpendicular planar view taken along line 8—8 in FIG. 1 showing the transmission in the first operating condition.

The first eccentric bearing means 54, or alternately power cam eccentric 54, is circular in lateral cross section having a center axis displaced to one side of central axis 16 and correspondingly referred to as a first eccentric axis 70 (FIG. 8). Power cam eccentric 54 has a splined opening 58 which is offset from first eccentric axis 70. Splined opening 58 is received by a splined section 60 of input drive shaft 12 for rotating power cam eccentric 54 in unison with shaft 12. A plurality of holes 62 are also provided in power cam eccentric 54 to minimize weight.

Power cam eccentric 54 rotatably receives a power cam 64 about its circular periphery. Power cam 64 is generated about a cam axis 66 which is parallel to central axis 16. Power cam 64 includes a centrally offset opening 68 which receives the periphery of power cam eccentric 54. Accordingly, power cam 64 is rotatably mounted to power cam eccentric 54 for selective rotation relative thereto about first eccentric axis 70, which in turn is parallel to and spaced outwardly to one side of central axis 16. In this manner, power cam 64 is selectively rotatable about the central axis in unison with input drive shaft 12, and is also selectively rotatable about first eccentric axis 70 relative to or independent of the rotation of input drive shaft 12. Rotation of power cam 64 relative to power cam eccentric 54 enables selective angular positioning of power cam axis 66 relative to central axis 16 to effect variation of the speed of output driven shaft 14, as will be more fully described below. A plurality of holes 63 are provided in power cam 64 to minimize weight.

Second eccentric bearing means 56, alternately counterbalance eccentric 56, is circular in lateral cross section and has a center axis 82. Center axis 82, alternately second eccentric axis 82, is displaced from central axis 16 the same distance as first eccentric axis 70 is displaced, but in the opposite radial direction. Counterbalance eccentric 56 has a splined opening 74 which is offset from second eccentric axis 82. Splined opening 74 is received by splined section 60 of input drive shaft 12 adjacent to the power cam eccentric 54. Accordingly, counterbalance eccentric 56 is fixably mounted to input drive shaft 12 and rotates in unison with it.

Figure 6:
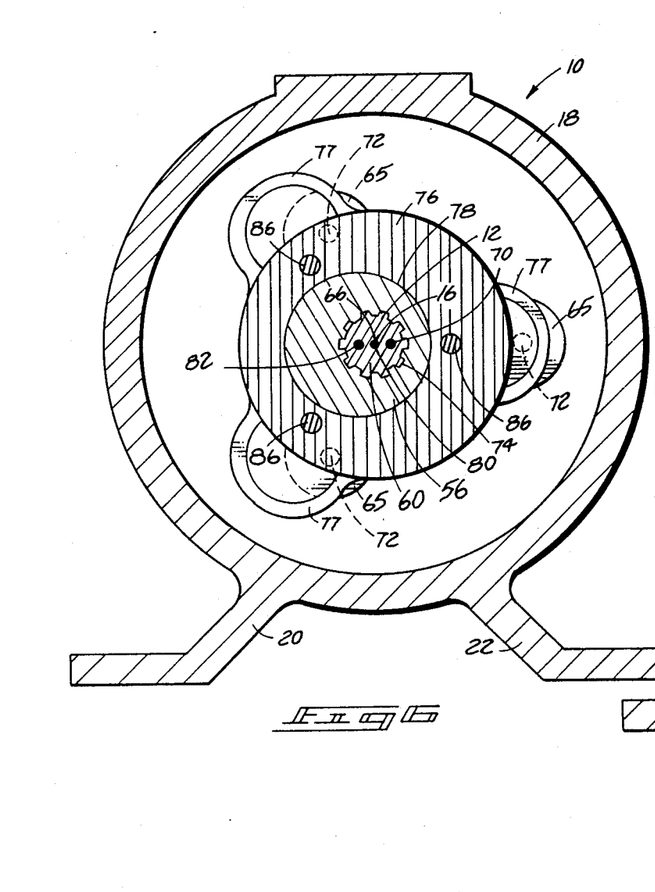
FIG. 6 is a perpendicular planar view taken through line 6—6 in FIG. 1 showing the transmission in the first operating condition.
Figure 7:
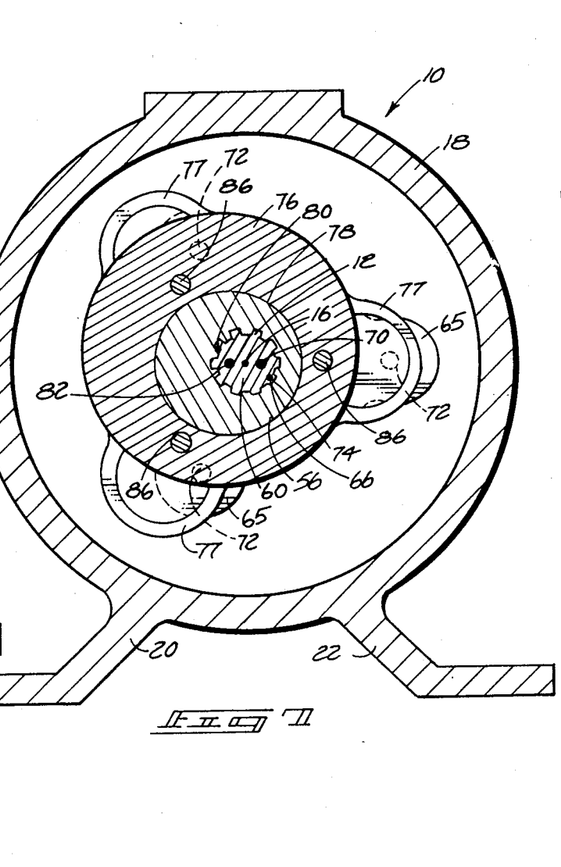
FIG. 7 is a perpendicular planar view as would be taken through line 6—6 in FIG. 1 when the transmission is configured to be in the second operating condition.

A counterbalance 76 is received about the circular periphery of counterbalance eccentric 56 (FIG. 6). Counterbalance 76 is generated about a counterbalance axis 80 which is parallel to central axis 16. Counterbalance 76 includes a centrally offset counterbalance opening 78 which receives counterbalance eccentric 56. In this manner, counterbalance 76 is mounted for rotation about second eccentric axis 82 which is parallel to and spaced to the side opposite the one side of central axis 16 at which first eccentric axis 70 is spaced. Rotation of counterbalance 76 about counterbalance eccentric 56 causes the angular positioning of counterbalance axis 80 to be selectively varied relative to central axis 16.

An orbital eccentric coupling means is provided for operatively connecting the cam and the counterbalance to impart simultaneous rotational movement to them in response to rotational movement imparted to either about their respective bearings, as will be more fully described below. Such rotational movement about the eccentric bearings moves or offsets the cam and counterbalance axes in opposite radial directions from the central axis. By camming action, this imparts an alternating radially directed motion for operatively imparting a rotational drive force to the output driven shaft. Counterbalance 76 offsets eccentric forces which would otherwise be imparted to the input shaft 12 by the radially imbalanced power cam 64. Adjustment or speed changing means, rotatable about the central axis with the input drive shaft, is operably connected to the cam and/or counterbalance for selectively causing rotation thereof about their respective eccentric axes.

The adjustment means is shiftable between a first condition and a second condition. In the first condition, rotational movement is imparted to power cam 64 and counterbalance 76 about their respective eccentric bearings 54 and 56. In the second condition, cam 64 and counterbalance 76 are effectively locked to their bearings for rotational motion in unison with input drive shaft 12.

The adjustment means serves to move the cam and counterbalance axes 66 and 80 relative to their respective first and second eccentric axes 70 and 82, whereby opposite radially directed movement is imparted to cam 64 and counterbalance 76 relative to central axis 16. In this manner, the amplitudes of the radially directed motions of counterbalance 76 and cam 64 can be simultaneously varied with no eccentric rotational forces being imparted to the input drive shaft.

The amplitude of the radially directed motion of power cam 64 determines the rotational speed of output shaft 14 relative to that of input shaft 12, as will be more readily apparent from the continuing discussion. The greater the amplitude, the higher will be the rotational speed of output driven shaft 14. When no radially directed motion is imparted by cam 64, i.e. rotation of the cam about the central axis 16 is concentric with the rotation of the input drive shaft 12, no rotational motion is imparted to output drive shaft 14.

Cam follower means engages the periphery of cam 64 for converting rotational motion of input drive shaft 12 to an alternating radially directed motion. More particularly, a plurality of four cam followers 88 and a ring member 90 operably engage power cam 64 (FIGS. 8, 9). Cam followers 88 and ring member 90 do not rotate with input drive shaft 12, while power cam 64 normally does. Power cam 64 includes a longitudinally extending circular cam surface 94 which engages and is separated from cam followers 88 and ring member 90 by a plurality of cylindrical roller bearing elements 92. Ring member 90 is J-shaped in longitudinal cross section, with the external portion of the stem of the "J" engaging cylindrical roller bearing elements 92. The lower portion of each of the plurality of cam followers 88 is correspondingly J-shaped in longitudinal cross section to provide a rotationally slidable, yet radially interlocking, fit of cam followers 88 relative to ring member 90. The remaining portion of each of cam followers 88 projects radially outward from the J-shaped portion and includes an axial hole 96.

Each of cam followers 88 engages one of a series of four crankshafts 98 which are themselves operably connected to one of a series of four unidirectional clutches 100. Each of crankshafts 98, having a center axis 113, extends longitudinally parallel with input drive shaft 12 and has varied diameter sections. The output ends of each of crankshafts 98 are rotationally received and supported by a plurality of recesses 102 formed in end cap/gear mounting plate 36. These ends of crankshafts 98 are rotationally supported therein by a plurality of cylindrical roller bearing elements 104. Each of crankshafts 98 is also rotationally supported at an intermediate section which extends through one of a plurality of openings 106 in pinion support plate 48. Rotational bearing elements 107 surround the intermediate section within each of openings 106 for rotationally supporting the crankshafts. In this manner, each crankshaft 98 is rotationally supported for alternating, high frequency oscillating motion about its axis 113.

The input end of each of crankshafts 98 includes a large diameter section 108 which is positioned adjacent the input end face of pinion support plate 48. A plurality of laterally oriented cylindrical roller bearing elements 110 are positioned between large diameter section 108 and that same face. Roller bearing elements 110 are retained therebetween in annular recesses 112 formed in the face of pinion support plate 48 and surrounding openings 106.

Each of crankshafts 98 includes a crankpin 114 projecting axially toward the input end of the transmission from enlarged diameter section 108. Each crankpin 114 is radially offset from its respective crankshaft center axis 113 (See FIGS. 8 and 9). Crankpins 114 are each rotationally received by an opening 96 in one of the cam followers 88. Crankpins 114 are rotationally supported within holes 96 by a plurality of longitudinally oriented cylindrical roller bearing elements 116 interposed between crankpins 114 and cam followers 88. Alternately, the crankpins as well as the crankshafts can be supported by sleeve bushings rather than roller bearing elements. Additionally, crankshafts 98 and crankpins 114 are preferably hollowed to reduce weight.

When circular cam surface 94 is eccentrically offset relative to central axis 16, alternating radially directed motion is sequentially imparted to each of cam followers 88 through ring member 90 as input shaft 12 rotates about central axis 16. Such alternating radially directed motion translates, through offset crankpins 114, into oscillating motion of crank shafts 98. The greater the degree of eccentric offset of power cam 64 relative to center axis 16, the greater the amplitude of the oscillating motion. As will also be apparent, the greater the speed of rotating input drive shaft 12, the greater will be the frequency of such alternating rotary motion.

The oscillating motion of each crankshaft 98 is translated into rotary motion by means of unidirectional clutches 100. Each unidirectional clutch 100 is axially supported between a pair of ball bearings 111 which surround crankshaft 98 and rotationally support a pinion gear 124.

Figure 11:
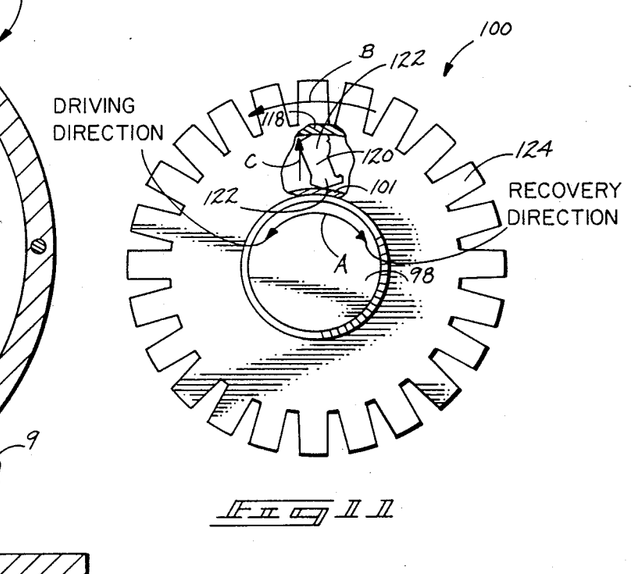
FIG. 11 is a diagrammatic section view of a freewheeling unidirectional clutch employed in the transmission.

Reference is made to FIG. 11 for an explanation of a preferable unique orientation and operation of such unidirectional clutches. A free-wheeling unidirectional clutch 100 is illustrated diagrammatically as comprising a central reversibly moving driving member 101 (connected to crankshaft 98) and a constantly rotating outer output driven member 118 (connected to pinion gear 124). Arrow "A" indicates oscillating motion of shaft 98, while arrow "B" indicates constant one directional rotary motion of gear 124.

A plurality of sprags 120 encircle input driving member 101 and extend between such element and constantly rotating output driven member 118. Each sprag 120 includes radially opposing pawls 122 which engage the driving and driven members. Such free-wheeling unidirectional clutches constructed as just described have heretofore been constructed such that their biasing springs exert force on the sprags to urge pawls 122 against the intermittently driving member. In accordance with the invention, it has been discovered that such free-wheeling, unidirectional clutches perform best in high frequency oscillating applications (for which they were not intended, such as in the instant transmission) if the biasing springs urge the pawls against the constantly rotating driven member, as indicated by arrow "C". Although FIG. 11 illustrates the central shaft as being the reversibly driven member and the outer member as being the constantly rotating member, this relationship, and correspondingly the direction of biasing force "C", could be reversed without departing from the invention.

Referring again to FIGS. 1–10, a plurality of rotatable drive means is arranged equiangularly about output driven shaft 14 and operably connects each of unidirectional clutches 100 and output driven shaft 14 for imparting rotational movement thereto. More particularly, the output driven element 118 of each unidirectional clutch 100 securely receives a pinion gear 124. In this manner, a series of four pinion gears 124 are equiangularly received about output driven shaft 14 and form a series of four planetary gears. Each of pinion gears 124 engages an arcuate segment of a sun gear 126 which surrounds and is fixably secured to output driven shaft 14. In operation, cyclical driving forces are imparted sequentially by each of pinion gears 124 to sun gear 126 through the cam followers, crankshafts and unidirectional clutches. Although a plurality of four cam followers, crankshafts, unidirectional clutches, and pinion gears are illustrated in the depicted embodiment, more or less of each could be employed without departing from the principles and scope of the invention.

One embodiment of the adjustment and coupling means by which power cam 64 and counterbalance 76 are rotated about their respective eccentric bearings 54 and 56 will now be described. In the preferred embodiments, the adjustment and coupling means includes an orbital eccentric coupling means which interconnects the cam and counterbalance. The orbital eccentric coupling means functions to impart simultaneous rotation of the cam and counterbalance about their respective first and second eccentric bearings. The orbital eccentric coupling means is mounted for rotation with the input drive shaft and also for rotation about the input drive shaft independent of rotation of the input drive shaft.

Figure 4:
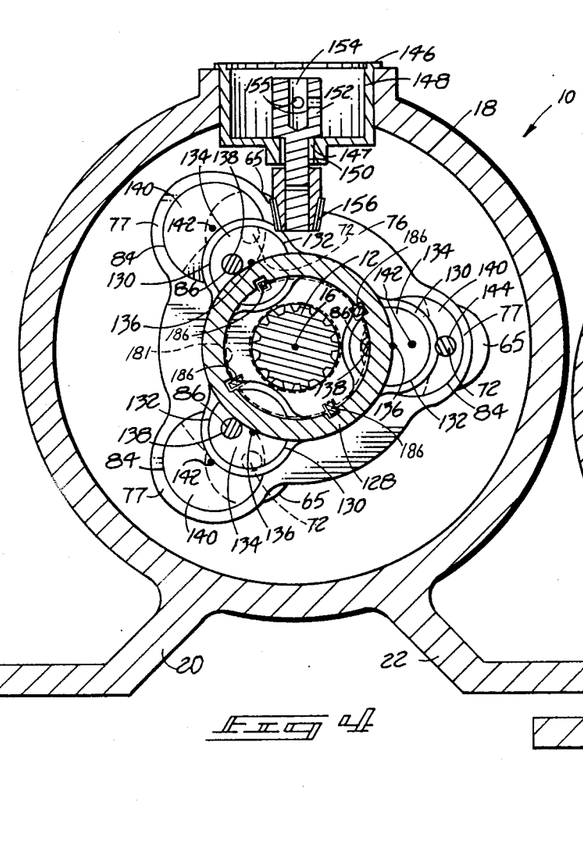
FIG. 4 is a perpendicular planar view taken through line 4—4 in FIG. 1 showing the transmission in a first operating condition.
Figure 5:
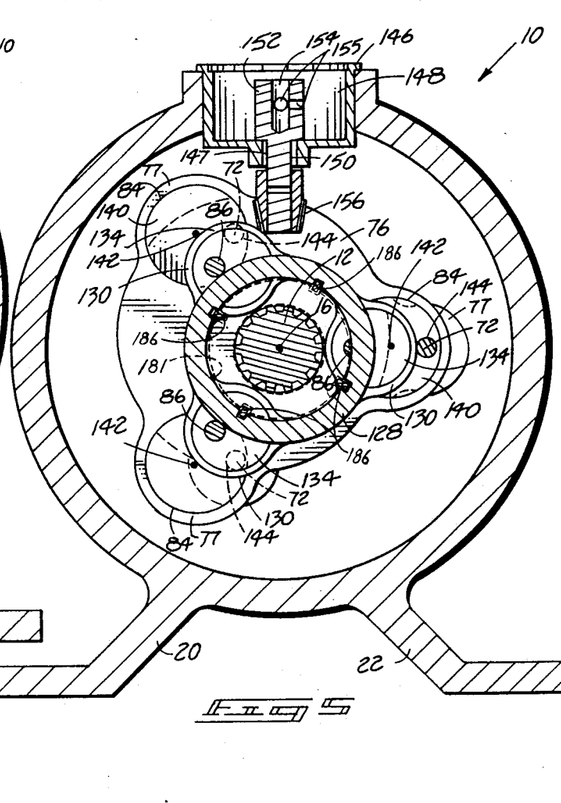
FIG. 5 is a perpendicular planar view as would be taken through line 4—4 in FIG. 1 when the transmission is configured to be in a second operating condition.

For example in the embodiment depicted in FIGS. 1–10, rotational motion is imparted to counterbalance 76 by means of a drive collar 128 (see FIGS. 4 and 5). Rotational movement of counterbalance 76 about its eccentric bearing 56, and correspondingly relative to input drive shaft 12, is simultaneously transferred to power cam 64 by an orbital eccentric coupling means to provide the desired eccentric offset and balancing effects.

More particularly, drive collar 128 encircles drive shaft 12 and includes an input end and an output end. Drive collar 128 normally rotates with input drive shaft 12. It is also selectively rotatable relative to input drive shaft 12. It is selective rotation of drive collar 128 relative to input drive shaft 12 which initiates rotation of the cam and counterbalance about their respective eccentric bearings.

Drive collar 128 includes a plurality of three equiangularly positioned, radially displaced lobes 130 positioned adjacent the output end thereof. Each of lobes 130 includes a circular receptacle 132 which is adapted to receive one of a plurality of three first orbital rotational elements, or solid eccentric cylindrical drive plugs, 134. Receptacles 132 are equidistant from and equiangularly positioned about central axis 16. Each cylindrical drive plug 134 has a center axis 136 and is supported within a receptacle 132 for rotation therewithin. Accordingly, each first cylindrical drive plug 134 is mounted for rotation with input drive shaft 12 through drive collar 128. Each first drive plug 134 is also mounted for rotation within receptacles 132 of drive collar 128, independent of rotation of input drive shaft 12. Further, each first drive plug 134 is mounted by drive collar 128 for rotation about input drive shaft 12 independent of rotation of input drive shaft 12. Each of first cylindrical drive plugs 134 also includes a first cylindrical opening 138 eccentrically positioned relative to its center axis 136.

First cylindrical drive plugs 134 operably engage counterbalance 76. Specifically, the input end face of counterbalance 76 includes three bolts or cylindrical pegs 86 extending outwardly therefrom. Pegs 86 are equiangularly positioned about counterbalance opening 78, and correspondingly second eccentric axis 82, at a predetermined radial distance. Each peg 86 is rotationally received within one opening 138 in each of the first cylindrical drive plugs 134.

Counterbalance 76 additionally includes a plurality of three equiangularly positioned, radially displaced lobes 77 adjacent its output end. Each lobe 77 includes a circular receptacle 84 extending inwardly from the output end face thereof. Receptacles 84 are equidistant from and equiangularly positioned about second eccentric axis 82. Each receptacle 84 rotatably receives one of a plurality of second rotational elements of second eccentric cylindrical drive plugs 140. Each second cylindrical drive plug 140 includes a center axis 142 and is supported within receptacle 84 for rotation therewithin. Accordingly, each second cylindrical drive plug 140 is mounted for rotation with input drive shaft 12 as counterbalance 76 rotates with input drive shaft 12. Each second drive plug 140 is also mounted for rotation within receptacles 84 of counterbalance 76 independent of rotation of input drive shaft 12. Further, each second drive plug 140 is mounted by counterbalance 76 for rotation about input drive shaft 12 independent of rotation of input drive shaft 12. Each second eccentric cylindrical drive plug 140 also includes a second cylindrical opening 144 eccentrically positioned relative to its center axis 142.

Each second ecentric cylindrical drive plug 140 is adapted for engaging power cam 64. More particularly, power cam 64 includes a plurality of three equiangularly positioned, radially displaced lobes 65. Each lobe 65 includes a cylindrical peg or pin 72 projecting outwardly in the direction of the input end of the transmission. Pins 72 are equiangularly received about power cam opening 68, and correspondingly first eccentric axis 70, at a predetermined radial distance. Each pin 72 is rotatably received by second eccentric cylindrical openings 144. Rotational movement of drive collar 128 relative to input drive shaft 12 operably engages the various drive plugs and pegs, as will be described below.

Rotational engaging means by which drive collar 128 is selectively rotated about central axis 16 relative to input drive shaft 12 will now be described. The rotational engaging means is advantageously driven by means of a motor or manual crank (not shown) mounted externally to transmission housing 18. As illustrated, a motor flange 146 is positioned atop the housing 18 for securing a speed adjusting motor thereto. Motor flange 146 includes a circular cavity 148 extending into the cavity of transmission 10. The lower central portion of cavity 148 includes a circular opening 150 which rotatably supports a pinion shaft 152 by means of roller bearing elements 147. The upper portion of pinion shaft 152 includes an enlarged head having an opening 154 extending downwardly from its upper surface. Opening 154 is adapted to receive a drive shaft from the speed adjusting motor. Radial holes 155 receive locking pins which interlock pinion shaft 152 with that of the drive shaft of the motor. The lower portion of pinion shaft 152 has a beveled pinion drive gear 156 fixed to it.

Beveled drive gear 156 operably engages a displacement beveled ring gear 158 which rotatably encircles input drive shaft 12. Ring gear 158 includes a beveled gear surface which faces the output end of the transmission, and an opposing flat annular surface 162 facing the input drive shaft end of the transmission. The beveled gear surface meshes with beveled drive gear 156. A longitudinally extending portion 164 of ring gear 158 projects toward the input end of the transmission from the radially innermost portion of flat annular surface 162. An annular retaining flange 166 is slidably received by surface 162 and the outer surface of portion 164 whereby displacement ring gear 158 is rotatably received relative to input drive shaft 12 for rotational driving by beveled drive gear 156. Annular retaining flange 166 is bolted to a plurality of extensions 157 projecting longitudinally outward from the output end face of input end cap 24. A thrust washer/lock ring 160 is threaded to the external input end of portion 164 for axially retaining ring gear 158 relative to flange 166.

The internal cylindrical surface of displacement ring gear 158 is threaded for meshing engagement with a threaded external surface of a displacement bearing 168. Displacement bearing 168 is generally circular in lateral cross section including upper and lower diametrically opposed lobe portions 170 and 172, respectively. Each lobe 170, 172 includes a longitudinally through extending hole 174 which slidably receives an axial guide pin 176. Guide pins 176 extend parallel to central axis 16 and are anchored at their input ends within openings 178 formed in the output end face of input end cap 24. Displacement bearing 168 is adapted for sliding along pins 176. Displacement bearing 168 also includes a cylindrical portion 169 projecting longitudinally from lobes 170, 172 toward the output end of the transmission. The exterior surface of cylindrical portion 169 is threaded for meshing with the internal threaded portion of ring gear 158. Rotation of ring gear 158 causes longitudinal movement of displacement bearing 168 relative to input shaft 12 as the result of this threaded connection.

A ball bearing 34 interconnects displacement bearing 168 with a fast lead nut 181 which rotates with input drive shaft 12. The outer race of bearing 34 is internally fixed to displacement bearing 168 to secure it from rotation by means of a bearing housing lock nut 184 which is threaded to displacement bearing 168. The internal race of bearing 34 is secured to the external portion of fast lead nut 181 by means of a standard bearing lock nut and washer 182. The internal portion of fast lead nut 181 is threaded and meshes with an externally threaded portion 188 of input drive shaft 12. Fast lead nut 181 normally rotates with input shaft 12. Longitudinal movement of fast lead nut 181 imparts rotational movement to lead nut 181 relative to input shaft 12 through threaded portion 188.

Fast lead nut 181 is longitudinally slidable but rotationally secured with respect to drive collar 128 by means of radially opposing pairs of key bars 186. Key bars 186 are received by square longitudinal slots formed in each of lead nut 181 and drive collar 128. A pair of screws 187 extend from the exterior of drive collar 128 and thread into each of key bars 186 for securing purposes. Rotation of lead nut 181 causes longitudinal sliding of nut 181 relative to drive collar 128 and key bars 186 by interaction of the threads of nut 181 and portion 188 of shaft 12. Such rotation of lead nut 181 also causes rotation of drive collar 128 because of interaction with key bars 186. In this manner, rotational motion imparted to fast lead nut 181 by longitudinal displacement thereof is directly translated to drive collar 128.

Operation

Reference is now made to the paired FIGS. 4 and 5; 6 and 7; and 8 and 9. FIGS. 4, 6 and 8 are planar sectional views showing the various transmission components as configured when the transmission is in an idle condition, i.e., circular cam surface 94 is concentric with input drive shaft 12. FIGS. 1 and 2 also illustrate the transmission in the idle condition. FIGS. 5, 7 and 9 illustrate the configuration of the various transmission components when drive collar 128 has been rotated 120° relative to input drive shaft 12 in the counterclockwise direction (alternatively 240° in the clockwise direction).

In the idle condition, circular cam surface 94 is concentric with input drive shaft 12. Cam axis 66 and counterbalance axis 80 are coincident with central axis 16. Rotation of input drive shaft 12 thereby imparts no alternating radially directed motion to cam followers 88. Accordingly, regardless of the rotary speed of input shaft 12, the rotational speed of output shaft 14 will be zero.

To adjust the speed of the output shaft, rotational movement is first imparted to pinion shaft 152 by means of a speed governing motor (not shown). Rotation of shaft 152 rotates beveled drive gear 156 which engages ring gear 158. Rotation of ring gear 158 axially moves displacement bearing 168 as the result of the meshing engagement of threads on the displacement bearing and ring gear housings. Axial movement of displacement bearing 168 also axially moves fast lead nut 181. The inclined threads of fast lead nut 181 bear against the inclined threads 188 on input drive shaft 12. This causes fast lead nut 181 to rotate relative to input drive shaft 12. Rotation of fast lead nut 181 relative to input drive shaft 12 imparts the same rotational motion to drive collar 128 through key bars 186.

Rotation of drive collar 128 imparts a rotational force against first eccentric drive plugs 134 within their receptacles 132, which impart force through pins 86 to counterbalance 76. Rotation of drive collar 128 also imparts rotation of drive plugs 134 about input drive shaft 12. Rotation of cylindrical drive plugs 134 and corresponding force against pins 86 results in rotation of counterbalance 76 about its eccentric bearing 56.

As counterbalance 76 rotates about its eccentric bearing 56, rotational force is imparted to second eccentric cylindric drive plugs 140 within their receptacles 84. This transmits torque to pins 72 projecting from power cam 64. This simultaneously forces drive plugs 140 to rotate about input drive shaft 12 and power cam 64 to rotate about its eccentric bearing 54. Inwardly or outwardly spiraling movement is thereby imparted to cam axis 66 and counterbalance axis 80 relative to central axis 16. Circular cam surface 94, and correspondingly ring member 90, are thereby eccentrically displaced relative to central axis 16 in one radial direction. The counterbalance is simultaneously radially offset in the opposite radial direction to maintain the input drive shaft in a dynamically balanced condition.

In this manner, the two sets of eccentric drive plugs and pegs provide respective first and second orbital means which selectively impart rotational movement of the cam and counterbalance means about their respective eccentric bearings. Collectively, the first and second orbital means comprise the above described orbital eccentric coupling means. The orbital eccentric coupling means is preferably comprised of at least three rotational elements, as shown, which directly interconnect the first and second eccentrically mounted means.

As the input shaft rotates, sequential alternating radially directed motion is imparted to each of cam followers 88, which translates into alternating rotation of each crankshaft 98. This is translated through the unidirectional clutches 100 to rotation of pinion gears 124. In this manner, cyclical driving force is sequentially imparted to each of pinion gears 124. This imparts a continuous driving force to sun gear 126, and correspondingly rotates output driven shaft 14. The greater the degree of offset, the greater will be the speed of the output driven shaft relative to that of the input drive shaft.

FIGS. 8 and 9 illustrate that cam followers 88 slide back and forth relative to ring member 90 with each alternating radially directed stroke. In FIG. 8, each of cam followers 88 is equiangularly positioned about ring member 90. In FIG. 9, the two upper left cam followers are closer to one another, while the two lower right cam followers are spaced further from one another. This is the result of each cam follower sliding back and forth relative to ring member 90 with each stroke. In the driving stroke, each cam follower applies force to ring member 90 while in the recapture stroke no force is there applied. Accordingly, a sequential rotation force is imparted to ring member 90 by each of the cam followers causing ring member 90 to precess about the cam axis relative to power cam 64.

The transmission is preferably configured to provide varying rotational speed of the output shaft relative to that of the input shaft from 0 up to a 1 to 1 ratio. Any speed changes are accomplished smoothly and continuously. Depending on the desired control, the transmission can be employed as a speed varying device or a speed regulating device. Very precise speed control of the output driven shaft is achieved with the described design.

Design Considerations

The effective path of oscillation of the crankpins imparted by the cam is a smooth sinusoidal curve having relatively short, small-radius peaks and a long flat shape between the peaks. Transmission components are preferably designed to provide an oscillation path of this shape to provide an efficient transmission. Such an efficient relationship is best achieved where any cam offset from center axis 16 of input drive shaft 12 results in crankpin strokes equally displaced on each side of the concentric, or "zero", crank position. Additionally, the maximum alternating cam stroke is preferably limited to prevent "rollover" (complete rotation) of crankshaft 98 which would occur were the alternating amplitude too great. Accordingly, the radial offset of each crankpin 114 axis relative to crankshaft axis 113 is preferably greater than one-half of a predetermined maximum of the amplitude of the cam offset.

Figure 12:
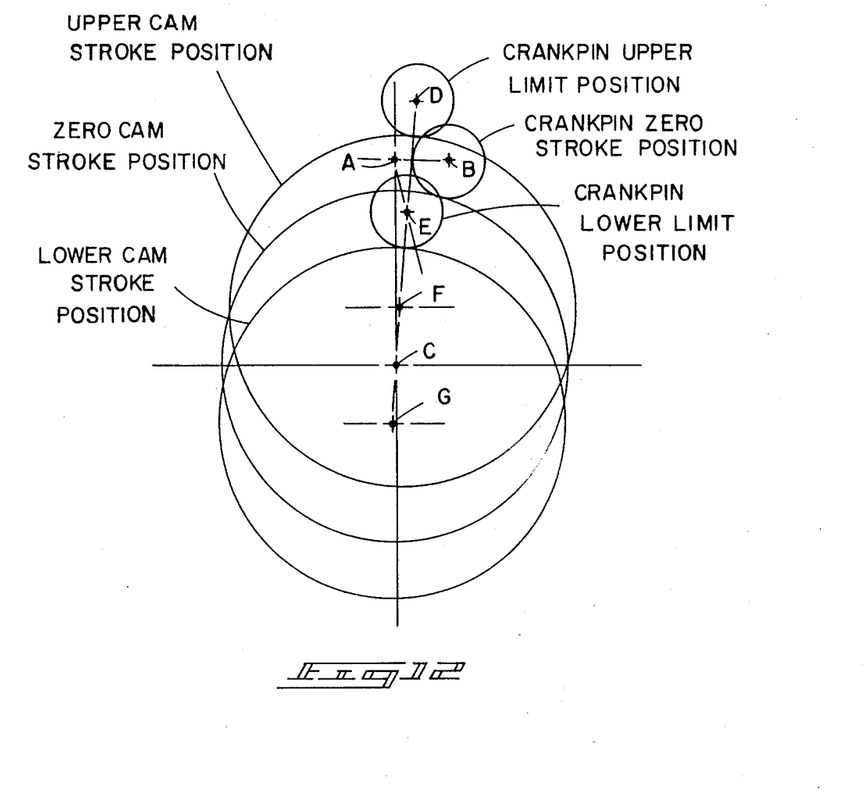
FIG. 12 is a plan view of the relationships regarding sizing of various components of the transmission for maximizing efficiency.

Reference is made to FIG. 12 for an explanation of desired relationships for constructing a transmission in accordance with the invention to provide the highest understood degree of efficiency. FIG. 12 illustrates the rolling movement of the crankpin about crankshaft axis A, the result of the alternating radially directed path of power cam 64. Points D, and E represent the center points of a crankpin 114 as it oscillates between maximum (D) and minimum (E) positions. Points C, F, and G represent the cam axis as it moves from a center position (C) to maximum (F) and minimum (G) radial displacements to produce maximum oscillation of the crankpins 114. Point B shows the zero stroke position for crankpin 114.

Preferably, the arcuate distance between lines AD and AE is designed to be 94 to 98 percent of a 180° arc. This prevents rollover of the crankshafts at the maximum and minimum limits while still using the near maximum theoretical 180° arc stroke. Additionally, the maximum (D) and minimum (E) positions should be arranged along a radius through the centered cam axis 66 that is to one side of crankshaft axis A and line AB should bisect line DE.

This positioning prevents rollover or rotation of the crankshaft during the alternating radially directed movement and maximum transmission efficiency. The effect is to equalize the rotational input to the crankshaft concentrically about the zero stroke position. Consequently, any power cam offset from center results in crankpin strokes equally displaced on each side of the zero crank position.

The general first step in designing a transmission in accordance with the invention is to first determine the speed and load to which the transmission will be subjected. The crankpin diameter and crankshaft offset are determined based upon the required speed and load capacity of the transmission. With the crankshaft offset determined, the power cam offset is thereby also determined. With these parameters established and the relationships above provided, one skilled in the art can establish the desired power cam radius to produce the most efficient operational geometry.

Once the sizing of the crankpins, necessary power cam offset, and power cam radius have been established, the counterbalance size can be determined to assure that the proper offset will be provided to maintain the input drive shaft in balance. The counterbalance weight must compensate for that of the power cam assembly (the power cam eccentric, the power cam, the ring member, and the roller bearing elements between the power cam and ring member). The counterbalance must also account for some of the weight of the cam followers and crankpins.

Preferably, the bearings which support the input and output shafts are sized and constructed to provide as near to zero clearances as possible to prevent axial and radial movement of such shafts relative to the power cam and the counterbalance. There are at least three advantages to such zero clearances. First, the output drive shaft speed is better controlled allowing for more precise control and adjustments. Second, efficient operation of the unidirectional clutches is maximized. Third, noise is minimized.

The above-described transmission is infinitely variable and can be adjusted either while operating or at rest. It is to be understood that preset or fixed ratio transmissions constructed generally as outlined above could be made, used, or sold without departing from the principals of the invention. For example, an end-user could require a transmission that only operates at a precise output shaft speed for a given input shaft speed. Transmissions constructed in accordance with the invention could be preset by the manufacturer to have the necessary power cam and counterbalance offsets to provide the necessary ratio to produce the desired precise output shaft speed. Once the proper ratio was established, the manufacturer could effectively lock the power cam and counterbalance offsets by welding, or otherwise, prior to shipping to the end-user. The infinite variability of the offsets and the near zero bearing clearances enable such precise speed control that the manufacture and inventorying of precise, fixed preset ratio transmissions may become practical.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A transmission comprising:
   an input drive shaft rotatable about a central axis;
   a cam selectively rotatable about the central axis with the input drive shaft, the cam being generated about a cam axis parallel to the central axis;
   a plurality of cam follower means engaging the cam for converting rotational motion of the input drive shaft to alternating radially directed motion of a selected amplitude;
   first eccentric bearing means rotatable with the input drive shaft and mounting the cam for rotation about a first eccentric axis parallel to and spaced to one side of the central axis for selectively positioning the cam axis relative to the central axis;
   counterbalance means for offsetting eccentric forces imparted to the input drive shaft during rotation of the cam about the central axis, the counterbalance means being selectively rotatable about the central axis with the input drive shaft and having a counterbalance axis parallel to the central axis;
   second eccentric bearing means rotatable with the input drive shaft and mounting the counterbalance means for rotation about a second eccentric axis parallel to and spaced to the opposite side of the central axis for selectively positioning the counterbalance axis relative to the central axis;
   a plurality of unidirectional clutch means respectively connected to the cam follower means for converting the alternating radially directed motion of the cam follower means to rotary motion of the unidirectional clutch means;
   an output driven shaft;
   a plurality of rotatable drive means arranged equiangularly about the output driven shaft and being operably interposed between the unidirectional clutch means and the output driven shaft for rotating the output driven shaft; and
   adjustment means operably connecting the cam and the counterbalance means for angularly moving the cam axis relative to the first eccentric axis and the counterbalance axis relative to the second eccentric axis by simultaneously rotating the cam and the counterbalance means about their respective first and second eccentric axes to impart opposite radially directed movement to the cam and the counterbalance means relative to the central axis, the adjustment means comprising:
   a plurality of orbital rotational elements drivingly interconnecting the cam and the counterbalance means, the driving rotational elements being mounted for rotation with the input drive shaft and also for selective rotation about the input drive shaft independent of rotation of the input drive shaft.

2. The transmission of claim 1 wherein the adjustment means imparts radially directed spiralling movement to the counterbalance and cam means relative to the central axis.

3. The transmission of claim 1 wherein the adjustment means comprises:

a drive collar which surrounds and normally rotates with the input drive shaft, the drive collar being alternately rotatable relative to the input drive shaft; and
   orbital eccentric coupling means operably connecting the drive collar with the cam and the counterbalance means for imparting opposite radially directed movement to the cam and the counterbalance means relative to the central axis upon rotation of the drive collar relative to the input drive shaft.

4. The transmission of claim 3 further comprising:
   rotational engaging means operably connected to the drive collar for selectively rotating it about the central axis relative to the input drive shaft.

5. The transmission of claim 1 wherein the plurality of orbital rotational elements number at least three.

6. The transmission of claim 1 wherein the cam includes a circular cam surface, the cam follower means being in engagement with the circular cam surface.

7. The transmission of claim 1 wherein the first and second eccentric bearing means are fixed relative to one another and the input drive shaft.

8. The transmission of claim 1 wherein the plurality of unidirectional clutch means are each engaged by a driving crankshaft, each driving crankshaft including a crankpin radially offset from the driving crankshaft axis, each crankpin engaging the cam follower means for imparting rotational motion to the driving crankshafts.

9. The transmission of claim 8 wherein the selected amplitude can reach a predetermined maximum; and
   the radial offset of each crankpin being greater than one-half the predetermined maximum.

10. The transmission of claim 1 wherein the plurality of unidirectional clutch means each includes an input driving member, an output driven member, and a plurality of sprags positioned between the input driving and output driven members, the sprags being biased against the output driven member.

11. The transmission of claim 1 wherein the output and input shafts are rotatably supported by bearings sized and constructed to provide near zero clearances for preventing axial and radial movement of such shafts relative to the cam and the counterbalance means.

12. A transmission comprising:
   an input drive shaft rotatable about a central axis;
   a cam selectively rotatable about the central axis with the input drive shaft, the cam being generated about a cam axis parallel to the central axis;
   a plurality of cam follower means engaging the cam for converting rotational motion of the input drive shaft to alternating radially directed motion of a selected amplitude;
   first eccentric bearing means rotatable with the input drive shaft and mounting the cam for rotation about a first eccentric axis parallel to and spaced to one side of the central axis for selectively positioning the cam axis relative to the central axis;
   counterbalance means for offsetting eccentric forces imparted to the input drive shaft during rotation of the cam about the central axis, the counterbalance means being selectively rotatable about the central axis with the input drive shaft and having a counterbalance axis parallel to the central axis;
   second eccentric bearing means rotatable with the input drive shaft and mounting the counterbalance means for rotation about a second eccentric axis parallel to and spaced to the opposite side of the central axis for selectively positioning the counterbalance axis relative to the central axis;
a plurality of unidirectional clutch means respectively connected to the cam follower means for converting the alternating radially directed motion of the cam follower means to rotary motion of the unidirectional clutch means;
an output driven shaft;
a plurality of rotatable drive means arranged equiangularly about the output driven shaft and being operably interposed between the unidirectional clutch means and the output driven shaft for rotating the output driven shaft;
adjustment means operably connecting the cam and the counterbalance means for angularly moving the cam axis relative to the first eccentric axis and the counterbalance axis relative to the second eccentric axis by simultaneously rotating the cam and the counterbalance means about their respective first and second eccentric axes to impart opposite radially directed movement to the cam and the counterbalance means relative to the central axis, the adjustment means comprising:
a drive collar which surrounds and normally rotates with the input drive shaft, the drive collar being alternately rotatable relative to the input drive shaft;
orbital eccentric coupling means operably connecting the drive collar with the cam and the counterbalance means for imparting opposite radially directed movement to the cam and the counterbalance means relative to the central axis upon rotation of the drive collar relative to the input drive shaft; the orbital eccentric coupling means comprising:
a first set of rotational elements each having a center axis radially displaced relative to the central axis of the input drive shaft and operably connecting the drive collar with either the cam or the counterbalance means;
a second set of rotational elements each having a center axis radially displaced relative to the central axis of the input drive shaft and operably connecting the cam and the counterbalance means; and
a plurality of pin means engaging the first and second sets of rotational elements eccentrically relative to their respective center axes for imparting opposite radially directed movement of the cam and the counterbalance means relative to the central axis upon selective rotation of the drive collar relative to the input drive shaft.

13. A transmission comprising:
an input drive shaft rotatable about a central axis;
a cam selectively rotatable about the central axis with the input drive shaft, the cam being generated about a cam axis parallel to the central axis;
a plurality of cam follower means engaging the cam for converting rotational motion of the input drive shaft to alternating radially directed motion of a selected amplitude;
first eccentric bearing means rotatable with the input drive shaft and mounting the cam for rotation about a first eccentric axis parallel to and spaced to one side of the central axis for selectively positioning the cam axis relative to the central axis;
counterbalance means for offsetting eccentric forces imparted to the input drive shaft during rotation of the cam about the central axis, the counterbalance means being selectively rotatable about the central axis with the input drive shaft and having a counterbalance axis parallel to the central axis;
second eccentric bearing means rotatable with the input drive shaft and mounting the counterbalance means for rotation about a second eccentric axis parallel to and spaced to the opposite side of the central axis for selectively positioning the counterbalance axis relative to the central axis;
a plurality of unidirectional clutch means respectively connected to the cam follower means for converting the alternating radially directed motion of the cam follower means to rotary motion of the unidirectional clutch means;
an output driven shaft;
a plurality of rotatable drive means arranged equiangularly about the output driven shaft and being operably interposed between the unidirectional clutch means and the output driven shaft for rotating the output driven shaft;
adjustment means operably connecting the cam and the counterbalance means for angularly moving the cam axis relative to the first eccentric axis and the counterbalance axis relative to the second eccentric axis by simultaneously rotating the cam and the counterbalance means about their respective first and second eccentric axes to impart opposite radially directed movement to the cam and the counterbalance means relative to the central axis, the adjustment means comprising:
first orbital means radially displaced from the central axis, the first orbital means being mounted for rotation with the input drive shaft and also for rotation independent of rotation of the input drive shaft, for selectively imparting rotational movement to the counterbalance means about the first eccentric bearing means; and
second orbital means radially displaced from the central axis, the second orbital means being mounted for rotation with the input drive shaft and also for rotation independent of rotation of the input drive shaft, for selectively imparting rotational movement to the cam about the second eccentric bearing means.

14. The transmission of claim 13 wherein the first orbital means comprises:
a plurality of first eccentric cylindrical drive plugs each having a center axis and being radially displaced from the central axis of the input drive shaft, the first drive plugs being supported for rotation about their respective center axes and each having a first cylindrical opening eccentrically positioned relative to its center axis;
a plurality of first cylindrical pegs extending from the counterbalance means and being rotatably received in the first cylindrical openings of the first drive plugs;
the second orbital means comprising:
a plurality of second eccentric cylindrical drive plugs each having a center axis and being radially displaced from the central axis of the input drive shaft, the second drive plugs being supported for rotation about their respective center axes and each having a second cylindrical opening eccentrically positioned relative to its center axis;
a plurality of second cylindrical pegs extending from the cam and being rotatably received within the second cylindrical openings of the second drive plugs.

15. The transmission of claim 14 wherein the first cylindrical pegs are equiangularly received about the second eccentric axis at a first radial distance; and the second cylindrical pegs are equiangularly received about the first eccentric axis at a second radial distance.

16. A transmission comprising:

a rotatable input drie shaft;

first eccentrically mounted means for imparting alternating radially directed motion of a selected amplitude relative to the input drive shaft upon rotation of the input drive shaft, the first means being mounted to the input drive shaft for selective rotation relative thereto;

second eccentrically mounted means for imparting alternating radially directed motion of a selected amplitude relative to the input drive shaft which is opposite in radial direction to that imparted by the first means, the second means being mounted to the input drive shaft for selective rotation relative thereto;

eccentric bearing means secured to the input drive shaft for mounting the first and second eccentrically mounted means to the input drive shaft for selective rotation relative to the input drive shaft;

a plurality of unidirectional clutch means operably connected to either the first or second eccentrically mounted means for converting its alternating radially directed motion to a rotary motion;

a rotatable output driven shaft;

a plurality of rotatable drive means corresponding in number to the plurality of unidirectional clutch means, the rotatable drive means being arranged equiangularly about the output driven shaft and operably connecting the unidirectional clutch means and the output driven shaft for rotating the output driven shaft; and adjustment means for selectively imparting simultaneous rotational movement to the first and second eccentrically mounted means about the eccentric bearing means to simultaneously selectively vary the amplitudes of the radially directed motions of the first and second eccentrically mounted means, the adjustment means being shiftable between a first condition in which rotational movement is imparted to the first and second eccentrically mounted means relative to the eccentric bearing means, and a second condition in which the first and second eccentrically mounted means are effectively locked to the eccentric bearing means for rotation with the input drive shaft, the adjustment means comprising:

orbital eccentric coupling means operably interconnecting the first and second eccentrically mounted means, the orbital eccentric coupling means being mounted for rotation with the input drive shaft and also for selective rotation about the input drive shaft independent of rotation of the input drive shaft;

whereby rotational speed of the output driven shaft relative to the input drive shaft is selectively variable and no overall eccentric rotational forces are imparted to the input drive shaft.

17. The transmission of claim 16 wherein the orbital eccentric coupling means comprises at least three rotational elements which drivingly interconnect the first and second eccentrically mounted means.

18. The transmission of claim 16 wherein, the plurality of unidirectional clutch means are each engaged by a driving crankshaft;

the driving crankshafts include crankpins radially offset from the driving crankshaft axes;

the crankpins engaging either the first or second eccentrically mounted means for imparting rotational motion to the driving crankshafts;

the alternating radially directed motion of the eccentrically mounted means engaged by the crankpins being able to reach a predetermined maximum; and the radial offset of each crankpin being greater than one-half the predetermined maximum.

19. The transmission of claim 16 wherein the plurality of unidirectional clutch means each includes an input driving member, an output driven member, and a plurality of sprags positioned between the input driving and output driven members, the sprags being biased against the output driven member.

20. The transmission of claim 16 wherein the output and input shafts are rotatably supported by bearings sized and constructed to provide near zero clearances for preventing axial and radial movement of such shafts relative to the first and second eccentrically mounted means.

21. A transmission comprising:

a rotatable input drive shaft;

first eccentrically mounted means for imparting alternating radially directed motion of a selected amplitude relative to the input drive shaft upon rotation of the input drive shaft, the first means being mounted to the input drive shaft for selective rotation relative thereto;

second eccentrically mounted means for imparting alternating radially directed motion of a selected amplitude relative to the input drive shaft which is opposite in radial direction to that imparted by the first means, the second means being mounted to the input drive shaft for selective rotation relative thereto;

eccentric bearing means secured to the input drive shaft for mounting the first and second eccentrically mounted means to the input drive shaft for selective rotation relative to the input drive shaft;

a plurality of unidirectional clutch means operably connected to either the first or second eccentrically mounted means for converting its alternating radially directed motion to a rotary motion;

a rotatable output driven shaft;

a plurality of rotatable drive means corresponding in number to the plurality of unidirectional clutch means, the rotatable drive means being arranged equiangularly about the output driven shaft and operably connecting the unidirectional clutch means and the output driven shaft for rotating the output driven shaft;

adjustment means for selectively imparting simultaneous rotational movement to the first and second eccentrically mounted means about the eccentric bearing means to simultaneously selectively vary the amplitudes of the radially directed motions of the first and second eccentrically mounted means, the adjustment means being shiftable between a first condition in which rotational movement is imparted to the first and second eccentrically mounted means relative to the eccentric bearing means, and a second condition in which the first and second eccentrically mounted means are effectively locked to the eccentric bearing means for rotation with the input drive shaft, the adjustment means comprising:

first orbital means radially displaced relative to the rotatable input drive shaft, the first orbital means being mounted for rotation with the input drive shaft and also for rotation independent of rotation of the input drive shaft, for selectively imparting rotational movement to the second eccentrically mounted means about the eccentric bearing means; and second orbital means radially displaced relative to the rotatable input drive shaft, the second orbital means being mounted for rotation with the input drive shaft and also for rotation independent of rotation of the input drive shaft, for selectively imparting rotational movement to the first eccentrically mounted means about the eccentric bearing means;

whereby rotational speed of the output driven shaft relative to the input drive shaft is selectively variable and no overall eccentric rotational forces are imparted to the input drive shaft.

* * * * *